United States Patent [19]

Matsue

[11] 3,832,699

[45] Aug. 27, 1974

[54] MEMORY CONTROL CIRCUIT

[75] Inventor: Shigeki Matsue, Tokyo, Japan

[73] Assignee: Nippon Electric Company Limited, Tokyo, Japan

[22] Filed: Sept. 18, 1973

[21] Appl. No.: 398,340

[30] Foreign Application Priority Data

Sept. 19, 1972 Japan .............................. 47-94370

[52] U.S. Cl. ........................ 340/173 DR, 340/172.5

[51] Int. Cl. ............................................ G11c 11/40

[58] Field of Search .................. 340/173 DR, 172.5

[56] References Cited

UNITED STATES PATENTS 3,748,651 7/1973 Mesnik ........................ 340/173 DR 3,790,961 2/1974 Palfi ............................ 340/173 DR

*Primary Examiner*—Terrell W. Fears

*Attorney, Agent, or Firm*—Sandoe, Hopgood & Calimafde

[57] ABSTRACT

A dynamic memory circuit in which the stored information is periodically refreshed includes a circuit for precharging the write digit lines of the memory circuit when an access signal is received from an external source. The precharge circuit includes circuit means which prevent the precharge of the write digit lines in response to an access signal while any of the write gates of the memory cells of the circuit are closed to prevent the destruction of the information stored in the memory cells.

5 Claims, 7 Drawing Figures

MEMORY CONTROL CIRCUIT

BACKGROUND OF THE INVENTION

The present invention relates to a dynamic memory circuit employing insulated-gate field effect transistors (hereinafter referred to as IGFET's), and particularly to such a circuit having protection against the destruction of the information stored in the memory circuit.

In general, a memory cell of a dynamic memory circuit includes a capacitor for storing information in the form of electric charges, a "write" gate for putting (or writing) information in the form of electric charges into the capacitor, and a "read" gate for taking out (or reading) information in the form of electric charges from the capacitor. In such a memory cell, the stored information will be lost gradually with a lapse of time because of leakage of electric charges from the capacitor. Therefore, the capacitor charge must be refreshed periodically. The dynamic memory circuit must therefore be operated with an extra cycle time for refreshing the electric charges on the capacitors in addition to the normal cycle time which is used for externally writing and reading information into and out of the capacitors of the respective memory cells.

In order to ensure high speed operation of the dynamic memory circuit, the memory circuit is often used in such a manner that access signals from an external source such as a central processing unit (CPU) are asynchronously supplied to the memory circuit and the refreshing cycle is executed asynchronously with the operation of the CPU during the period when no access signal is present from CPU. In such a system, an access signal may come to the memory circuit during the refreshing cycle, causing information to be read from or written into the memory circuit by the external source such as a CPU. To reduce the time necessary for preforming such an external read/write operation, it is necessary to interrupt the refreshing cycle and to execute the external read/write operation immediately. There is a possibility that the information stored in the cell will be destroyed by the interruption of the refreshing cycle during certain periods.

The refreshing cycle of the dynamic memory circuit begins with the precharging of a read digit line (RDL) which is connected to the read gate of the memory cell and a write digit line (WDL) which is connected to the write gate of the cell. After the precharge, the read gate is closed by a signal supplied by a read address line (RAL) causing the transfer of the information stored in the capacitor of the memory cell to the precharged RDL. The information is then transferred from RDL, to the WDL. Thereafter, the write gate of the cell is closed by a signal through a write address line (WAL) causing the information on the WDL to be transfered back to the capacitor of the memory cell. In this way the information stored in the capacitor is refreshed during each refreshing cycle. When the memory circuit receives an access signal from the CPU, the refreshing cycle is interrupted, and the memory cycle immediately begins an external read/write operation with the precharge of the WDL and the RDL. However, if the refreshing cycle is interrupted at a time when the write gate is closed, it may occur that the precharge voltage on the WDL rather than the information transferred to WDL will be written into the capacitor of the memory cell through the closed write gate. This can occur because the precharge of the WDL starts immediately. If this occurs the stored information in the memory cell will not be refreshed and will in fact be destroyed. Such destruction of the stored information can also occur in a dynamic memory circuit wherein the RDL is omitted and the read gate of the memory cell is connected to WDL.

Therefore, an object of this invention is to provide a dynamic memory circuit in which the stored information is protected against destruction based on the interruption of the refreshing cycle.

BRIEF DESCRIPTION OF THE INVENTION

According to this invention, a dynamic memory circuit is provided with means for generating a precharge signal commanding the precharge of the write digit line, said generating means including means to prevent the generation of said precharge signal until after the write gates of the memory cells which are connected to the write digit line are opened. In a first embodiment of the invention such generating means responds to a signal on the write address line indicating the closing of the write gates and delays the precharge command signal until after the signal indicating the closing of the write gates has disappeared from the write address line. Such a generating means comprises a NOR circuit having its input terminals connected to the write address lines of a memory matrix. The NOR circuit generates an output signal only when no write gate closing signal is present on any write address line. This output of the NOR circuit can be used as a signal commanding the precharge of all the write digit lines of the memory matrix. Another example of the generating means may includes a delay circuit which provides a delay signal to close a gate which connects a write address line to the ground. The delay circuit can be used with an inverter circuit which inverts a timing signal to make the write address line active. The delayed signal or the inverted timing signal can be used as the precharge command signal.

According to this invention, a signal commanding the precharge of the write digit lines is always generated when no signal is present on the address lines so that the write gates of memory cells are opened. In other words, the write digit lines are not precharged until the write gates are opened so that the stored information in the memory cells is fully protected against destruction, even when the refreshing cycle is interrupted due to an access from the CPU.

The invention will be described more in detail, with reference to the accompanying drawings in which FIG. 1 is a diagram of a memory circuit according to the first embodiment of this invention;

The description of the invention in this specification will be based on the assumption that IGFET's employed in the circuits are of the N-channel type and the high level referred to means the level "1" (binary one), while the low level is the level "0" (binary zero). As is known to those skilled in the art the functions of the circuits described would be essentially identical if P-channel type IGFET's are employed so that the present invention can be applied to memory circuits employing any kinds of IGFET's. Although a memory circuit of 64 bits will be described below as an example, the present invention can be similarly applied to memory circuits of an arbitrary number of bits.

Figure 1:
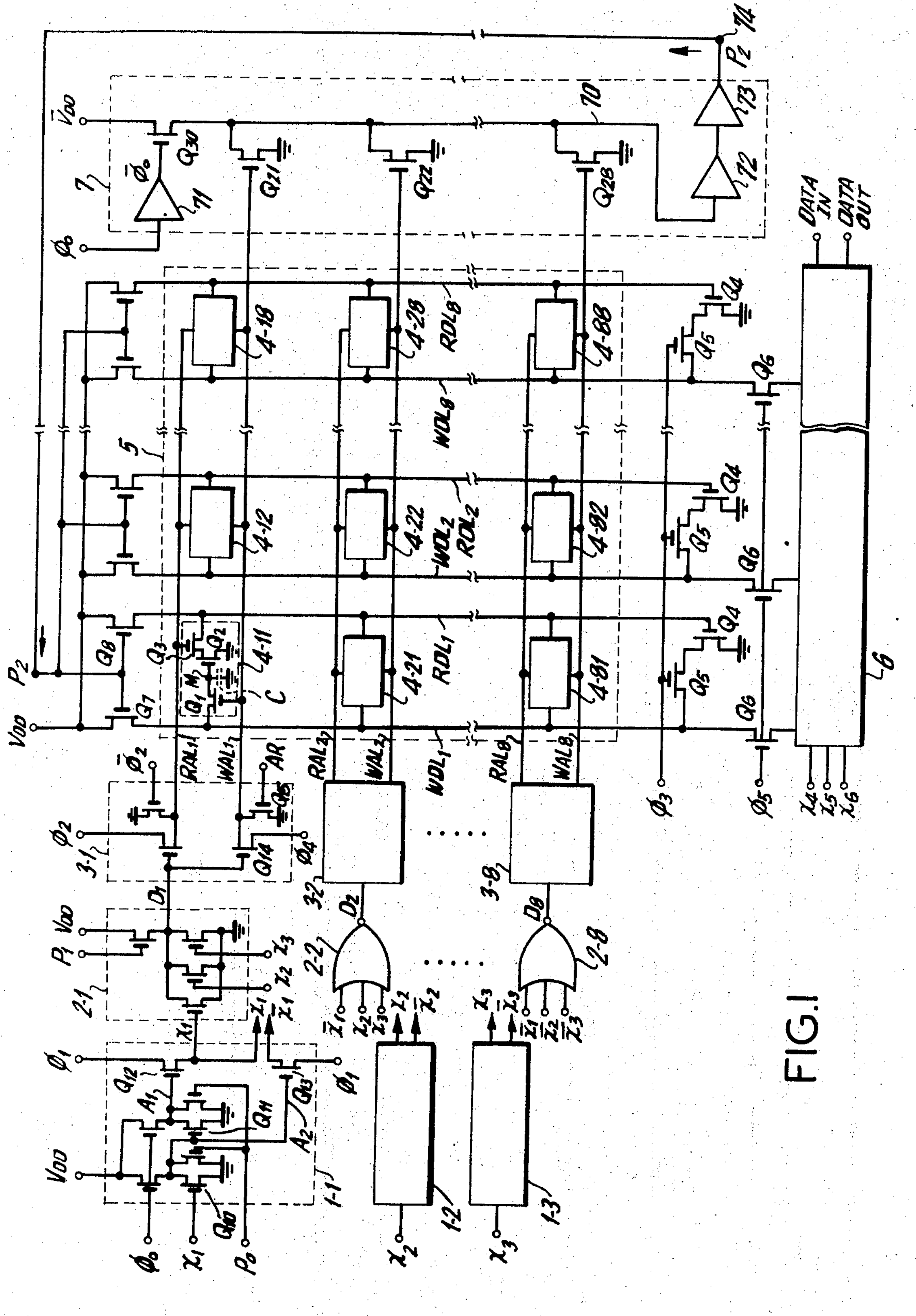

Referring to FIG. 1, a memory circuit of 64 bits receives six address signals $X_1$ to $X_6$ supplied from outside the circuit. Each of the first three input address signals $X_1$, $X_2$, and $X_3$ is applied respectively to an address buffer 1-1, 1-2, and 1-3 and each buffer produces amplified true and complementary signal ($X_1$, $\overline{X}_1$), ($X_2$, $\overline{X}_2$), ($X_3$, $\overline{X}_3$) corresponding to each address signal. The buffer output signals are applied to decoders 2-1 . . . 2-8 which consist of 3-input NOR circuits. The outputs $D_1 \ldots D_8$ of the decoders 2-1 . . . 2-8 are used for selection of the 64 memory cells 4-11 . . . 4-88 which are arranged to form a matrix 5 consisting of eight lines and eight columns. The selection of the 64 bits is divided into two parts. The selection of the first eight words in the memory matrix 5 is performed by using the true and complementary signals of the three address signals $X_1$ to $X_3$ which are applied respectively to eight address decoders 2-1 to 2-8. The output Di of the selected decoder 2-i (*i* represents 1,2, . . ., or 8) is subjected to power amplification to provide high speed operation by another switch 3-i and is then applied to a selected pair of read and write address lines RAL-i and WAL-i. The memory cells 4-i1 to 4-i8 of the eight bits connected to the selected address line pair are simultaneously subjected to either a read signal causing the stored information in the memory cells to be readout by read digit lines RDL-1 to RDL-8 or to a write signal causing information from the write digit lines WDL-1 to WDL-8.

The selection among the eight bits in the memory matrix 5 is carried out by processing the remaining three address signals $X_4$ to $X_6$ in a bit select line driver 6 which includes address buffers, decoders and switches similar to those described above and in which the selected digit lines WDL-j (*j* being 1,2, . . ., or 8) of the memory matrix 5 is connected to the terminals data IN and data OUT. By this arrangement, only one information bit is selected and read out from the information contained in the eight bits which are connected to a selected address line pair and which have all been simultaneously read out to the write digit lines WDL-1 to WDL-8.

In the write operation, data supplied from an external source to the IN terminal is written, through the selected digit line WDL-j, into the only one selected bit 4-ij where the selected address lines cross the selected digit lines. As for the remaining seven unselected bits of the selected address line, the data of the bits which is read out to the read digit lines (RDL) and is transmitted to the write digit lines (WDL) by data transmission circuits consisting of IGFET's $Q_4$ and $Q_5$ and is then rewritten into the unselected bits of the selected address line.

Figure 2:
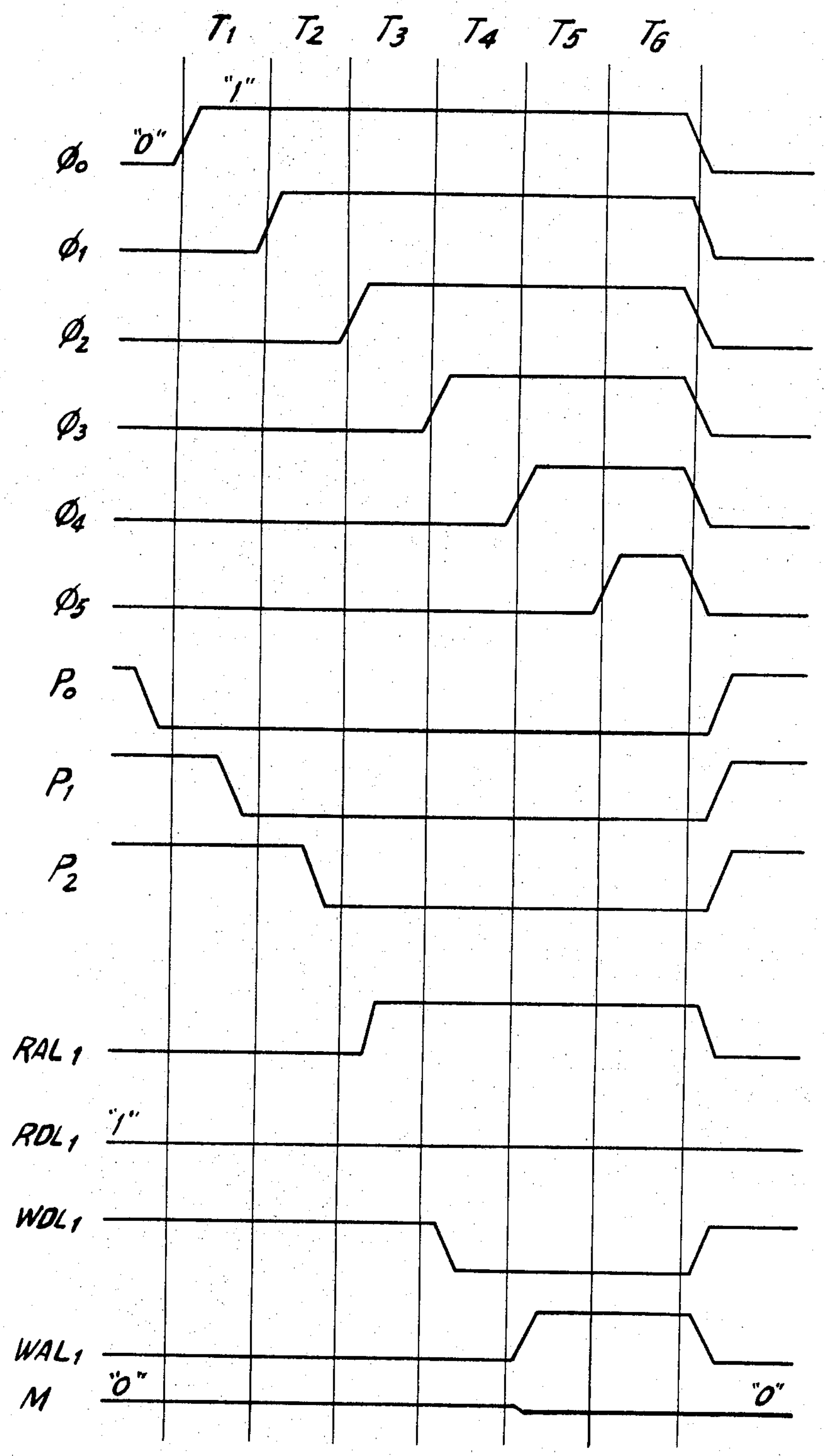
FIG. 2 shows waveforms to illustrate the operation of the memory circuit shown in FIG. 1.

These operations of the memory circuit of FIG. 1 are effected not concurrently but successively in time, and the sequence and mutual relation in time of the operations are determined by timing or command signals Ø0 to Ø5 and auxiliary timing signals P0 to P2 as shown in FIG. 2.

When the timing signal Ø0 is supplied to the address buffers 1-1 through 1-3, the inverter transistors $Q_{10}$ and $Q_{11}$ in each buffer operate to generate true and complementary signals responsive respectively to input address signals $X_1$ to $X_3$ appear at points A1 and A2 of the buffers 1-1 to 1-3. Prior to the signal Ø0, a timing signal Po, which had clamped the voltage of points A1 and A2 at a low level falls unclamping points A1 and A2. As soon as the levels of A1 and A2 have been determined, as $X_i$ and $X_i$ respectively the next timing signal Ø1 is applied to the transistors $Q_{12}$ and $Q_{13}$. A period T1 is the time required for determining the levels of the true and complementary signals $X_i$, $\overline{X}_i$ at the points A1 and A2 of the address buffers 1—1 to 1–3. Upon the application of signal Ø1, the signals $X_i$, $\overline{X}_i$ at the points A1, A2 in the address buffers 1—1 to 1–3 are transmitted through the switches $Q_{12}$, $Q_{13}$ to the inputs of the decoders 2–1 to 2–8. Before the application of signal Ø1, a timing signal P1 had clamped the outputs $D_1$ through $D_8$ of each decorder at 2-1 through 2-8 high level $P_1$ then falls down into the unselected bits of the selected address line. The output Di, of the selected decoder 2–i, which has all input signals at the low level is at the high level. The outputs of all the other decoders, in which at least one input is at the high level, fall to the low level. A period T2 is the time required for determining the level of the decoder outputs D after the application of the signal Ø1.

Then, the signal Ø2 is then applied to the switches 3–1 to 3–8. The outputs Di of the selected address decoder 2–i being high turns the corresponding read address line RAL–i to the high level. Prior to this all the read address lines have been clamped at the low level by signal $\overline{\text{Ø2}}$ and, the non-selected read address lines remain at the low level. Before signal Ø2, is applied the signal P2 falls to the low level. When P2 was high it had closed transistors $Q_7$ and $Q_8$ connecting the read and write digit lines RDL, and WDL to the power source VDD, respectively, and had caused all the digit lines RDL, WDL to be precharged at the high level of the power source. With the selected read address line RAL–i turned to the high level a, read operation of the memory cells 4–i1 to 4–i8 which are connected to RAL–i is initiated. In detail, the gate of a read gate transistor $Q_3$ is connected to the selected high level read address line RAL–i so that $Q_3$ is turned on and the data stored in the capacitance C at a point M of each memory cell (see cell 4–11 for example) is read out to each read digit line RDL. If the capacitor C is not charged and the point M is at the low level, an amplifying transistor $Q_2$ is biased off and the read digit line RDL of that memory cell will remain at the high level, whereas if the capacitor C is charged and the point M is at the high level, the transistor $Q_2$ the transistor will be biased on and the RDL will fall to the low level by being connected to the ground through the transistors $Q_3$ and $Q_2$ in the memory cell. A period of time T3 is required from the application of signal Ø2 to the determination of the level of the read digit lines RDL-1 through RDL-8.

Upon the application of signal Ø3, the data transmission transistors $Q_5$ are switched on causing the level of each write digit line WDL to be determined by the level of the corresponding read digit line RDL. If the RDL is at the low level, the WDL will remain at the high level to which it has been raised by P2. On the other hand, if RDL is at the high level $Q_4$ is switched on and, WDL is grounded through $Q_5$ and $Q_4$ and the level of WDL will fall to the low level. A period T4 is the time which is necessary to determine the level of WDL, or to perform the data transmission from the read digit lines to the write digit lines after the application of signal Ø3.

When signal Ø4 is applied to the switches 3–1 to 3–8, the high level of the output Di of the selected address decoder 2–i is transmitted to the corresponding write address line WAL–i by the transistor $Q_{14}$ of the switch 3–i. With the write address line WAL–i thus turned to the high level, the write gate transistor $Q_1$ of the memory cells 4–i1 to 4–8 turns on and the data having been transmitted to the write digit lines WDL–1 to WDL–8 to the point M of the respective memory cells which are connected with this write address line through $Q_1$. This is the "rewrite" operation of the stored data, because the data having been transmitted to WDL is in conformity with the stored data of the memory cells and is rewritten in the cells. A period T5 is the time necessary for the rewrite operation.

For writing new data into a memory cell from an external source, a timing signal Ø5 is applied to the write digit lines WDL–1 to WDL–8. When the signal Ø5 becomes high in level, all the write digit lines are prepared to be connected to the data IN terminal but only the selected write digit line WDL–j which has been already connected by the address signals $X_4$ through $X_6$ is able to receive new information from the external source and the information is written into the selected memory cell 4–ij which is connected to both the selected address lines and digit lines. A period T6 is a time required for a new information to be transmitted from the external source through the write digit line to the point M of the selected memory cell. The read operation of the stored data from the selected write digit line to the data OUT terminal is also performed in this period T6 by using signal Ø5.

The refreshing operation will now be explained more in detail, with reference to FIGS. 1 and 2. Assuming that the capacitor C of the memory cell 4–11 is not charged so that the stored information in this cell is 0. The signal $P_2$ which commands the precharge of the digit lines $WDL_1$ and $RDL_1$, drops to the low level, and then the timing signal $Ø_2$ causes the level of $RAL_1$ to rise as shown in FIG. 2. Since the stored information is 0, the level of $RDL_1$ remains high. Then the timing signal $Ø_3$ is then applied to the transmission transistor $Q_5$, causing $WDL_1$ to to drop the low level. Thereafter, the timing signal $Ø_4$ is applied through the transistor $Q_{14}$ of the switch 3–1 to the write address line $WAL_1$ which has been maintained at the low level because transistor $Q_{15}$ was closed by an address reset signal AR (in this case, $\overline{Ø}_4$) unclamping the decoder outputs. $WAL_1$ then rises to the high level and closes the write gate $Q_1$ of the memory cell 4–11. This permits charges which may have accumulated on the capacitor C to be discharged through $Q_1$ and $WDL_1$, and thus the information 0 is rewritten at the point M. Following the change of the signal $Ø_0$ to the low level, all the timing signals $Ø_1$ to $Ø_5$ fall to the low level and then signals $P_0$ to $P_2$ start to rise. However, if the signal $P_2$ starts to rise because of the interruption of the refreshing cycle at a time point when $WAL_1$ has not yet returned to the low level, charges from the power supply $V_{DD}$ will flow through the closed precharge gate $Q_7$ $WDL_1$ and the closed write gate $Q_1$ to charge the capacitor C and thereby destroy the stored information 0. In order to prevent such destruction, the precharge command signal $P_2$ should rise only after the timing signal $Ø_4$ falls, causing the address reset signal AR to rise and the write address line $WAL_1$ to fall to the low level.

Referring further to FIG. 1, this invention provides a circuit 7 for generating the precharge command signal $P_2$. This circuit 7 comprises a NOR circuit formed by switching transistors $Q_{21}$ to $Q_{28}$ which are connected in parallel with each other between, output point 70 and ground and a load transistor $Q_{30}$ which is connected between the output point 70 of the NOR circuit and the power supply $V_{DD}$. Each gate electrode of the switching transistors $Q_{21}$ to $Q_{28}$, which is an input terminal of the NOR circuit, is connected respectively to one of the write address lines $WAL_1$ to $WAL_8$. An inverter 71 is connected to the gate electrode of the load transistor $Q_{30}$ and the timing signal $Ø_0$ is applied to the imput of this inverter 71 to provide an output $\overline{Ø}_0$. The output point 70 of the NOR circuit is connected through two stages of inverters 72 and 73 to an output terminal 74 which is in turn connected to the gate electrodes of the transistors $Q_7$ and $Q_8$ which control the precharge the digit lines WDL and RDL.

In this circuit 7, the output point 70 will be at the low level if any of the write address lines $WAL_1$ to $WAL_8$ is at the high level indicating a closed write gate. The output point 70 will become high only when all the write address lines $WAL_1$ to $WAL_8$ are at the low level and an inverted timing signal $\overline{Ø}_0$ has risen to the high level closing $Q_{30}$. The two stages of inverters 72 and 73 serve to amplify the output signal present at point 70 and to delay the output signal slightly to ensure circuit operation. Thus, a precharge command signal $P_2$ is generated at the output terminal 74 and this signal $P_2$ becomes high only after all the write address lines are at the low level indicating that the write gates are closed, even if the cycle is terminated in any manner.

Figure 3:
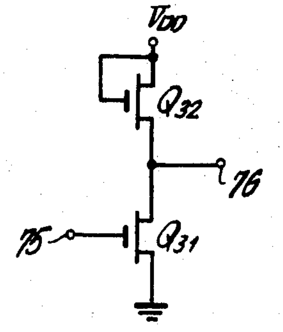
FIG. 3 is a diagram example of an inverter circuit which may be incorporated in the memory circuit of the invention.

The gate electrode of the load transistor $Q_{30}$ may be connected to the power source $V_{DD}$ with the inverter 71 omitted. Moreover, the precharge command signal $P_2$ may be taken from the output point 70 omitting inverters 72 and 73. Any known inverter circuit can be used for inverters 71 through 73. FIG. 3 shows an example of a usable known inverter circuit, which comprises a switching transistor $Q_{31}$ and a load transistor $Q_{32}$. Input and output terminals 75 and 76 of this inverter are the gate and drain electrodes of the switching transistor $Q_{31}$, respectively.

Figure 4:
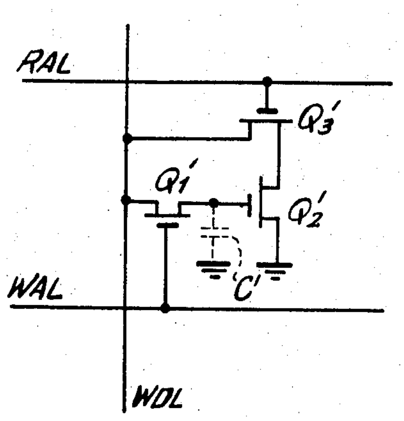
FIG. 4 is a diagram of another example of a dynamic memory cell which is usable in the memory circuit of the invention.

In the memory circuit of the invention, a memory cell such as that shown in FIG. 4 can be employed instead of the memory cell 4ij of FIG. 1. In such cell, the information stored in a capacitor C′ is read out through a read gate transistor $Q_3'$ to a write digit line WDL and the information is rewritten into the cell through a write gate transistor $Q_1'$ to the capacitor C′. Therefore, the problem to be solved with this memory cell is the same as in the case of using the memory cell 4ij of FIG. 1.

Figure 5:
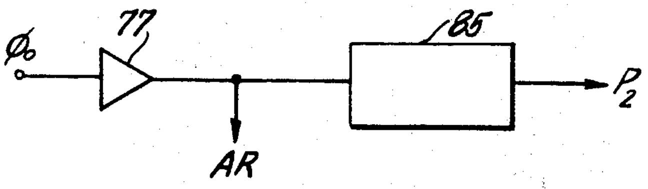
FIGS. 5, 6 and 7 are diagrams of alternate embodiments of a circuit for generating a signal commanding the precharge of the write digit lines of the memory matrix according to the invention.

Referring to FIG. 5, another example of a circuit for generating the percharge command signal $P_2$ comprises an inverter 77 and a delay circuit 85 connected in series to the output of the inverter 77. The timing signal $Ø_0$ is applied to the input of the inverter 77 to provide output $\overline{Ø}_0$. When the timing signal $Ø_0$ becomes low, the address reset signal AR which is the output $\overline{\phi}_0$ of inverter 77 becomes high. The signal AR turns gate $Q_{15}$ on providing a path to ground for the write address lines. The delay circuit 85 delays the signal AR for a time period which is long enough to insure that the write address lines have fallen to the low level in response to AR having turned to the high level. Thus, the signal $P_2$ is generated as a delayed signal from the address reset signal AR.

Figure 6:
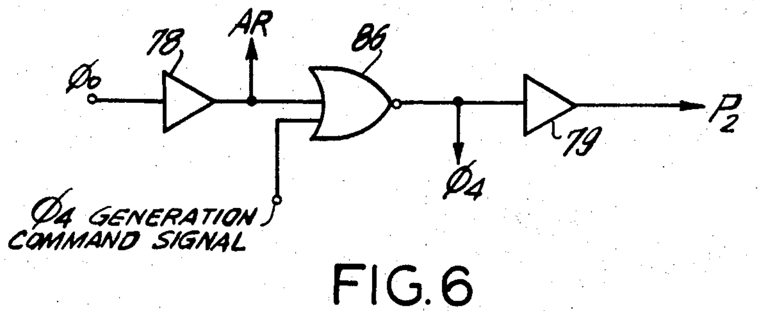

FIG. 6 illustrates still another embodiment of the invention which comprises a series connection of an inverter 78, a two-input NOR circuit 86 and a second inverter 79. The input of inverter 78 is timing signal $\phi_0$ and the inverter 78 produces an output $\overline{\phi}_0$ which serves as address reset signal (AR). Signal AR is applied to one input of NOR circuit 86 and a signal commanding the generation of signal $\phi_4$ is applied to the second input of the NOR circuit 86. After AR reaches the high level, the signal $\phi_4$ which is the output of NOR circuit 86, becomes low. Low signal $\phi_4$ is passed through inverter 79 to provide $P_2$ as its output which is then at the high level. The NOR circuit 86 and the inverter 79 perform the function of the delay circuit 85 of FIG. 5.

Figure 7:
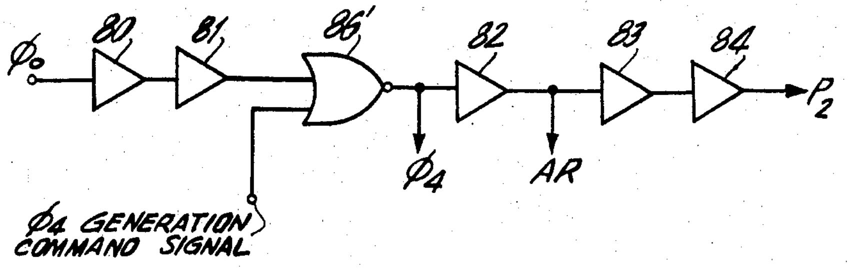

FIG. 7 shows a further embodiment of the invention which comprises two stages of series connected inverters 80 and 81 which receive input $\phi_0$, a two input NOR circuit 86' recieving as its inputs the output of the second inverter 81 and a signal commanding the generation of timing signal $\phi_4$ so that the output of the NOR circuit 86' is $\phi_4$. An inverter 82 receives $\phi_4$ and generates $\overline{\phi}_4$ which serves as an address reset signal which is applied to two stages of inverters 83 and 84. The output of the second inverter 84 serves as signal $P_2$. In this circuit, $\phi_4$ is initially at a low level causing AR to be high, and $P_2$ is generated by delaying high signal AR with two inverters 83 and 84.

In the circuits of FIGS. 5, 6 and 7, a known inverter circuit such as shown in FIG. 3 can be employed as the inverters 77 to 84.

It will be evident that the invention is applicable to any dynamic memory circuit where refreshing is needed including such circuits employing bipolar transistors.

What is claimed is:

1. A dynamic memory circuit including:

a plurality of memory cells each of said memory cells including a write gate and information storage means connected to said write gate, means for periodically refreshing the information stored in said information storage means, at least one write digit line connected to a number of said write gates said write digit line being adapted to provide voltage to write said information into said information storage means when said write gate is closed, means for providing a timing signal, generating means responsive to said timing signal to generate a precharge signal causing said write digit line to be precharged to a predetermined voltage condition, said generating means being adapted to prevent the generation of said precharge signal while any of said write gates are closed.

2. A dynamic memory circuit as claimed in claim 1, wherein said generating means includes at least one write address line, said write address line being connected to said write gates and the voltage on said write address line being representative of the closed condition of any of said write gates, and a NOR circuit connected in series between a voltage source and said at least one write digit line, said at least one write address line being connected to an input of said NOR circuit the output of said NOR circuit being said precharge signal.

3. A dynamic memory circuit as claimed in claim 2 including delay means connected between the output of said NOR circuit and said write digit lines.

4. A dynamic memory circuit as claimed in claim 1, wherein said generating means includes means to generate a reset signal in response to said timing signal, means responsive to said reset signal to open said write gates, a delay circuit having a delay period long enough to permit the open of said write gates by said reset signal, said reset signal 65 being connected to the input of said delay circuit and the output of said delay circuit providing said precharge signal.

5. A dynamic memory circuit as claimed in claim 4, wherein said delay circuit includes a two input NOR circuit series connected to an inverter circuit.

* * * * *

UNITED STATES PATENT OFFICE
CERTIFICATE OF CORRECTION

Patent No. 3,832,699 Dated August 27, 1974

Inventor(s) MATSUE, Shigeki

It is certified that error appears in the above-identified patent and that said Letters Patent are hereby corrected as shown below:

Claim 4 - Column 8, Line 38 - the word open should be opening

Claim 4 - Column 8, Line 39 - the number 65 should be deleted

Signed and sealed this 3rd day of December 1974.

(SEAL)
Attest:

McCOY M. GIBSON JR.
Attesting Officer

C. MARSHALL DANN
Commissioner of Patents